July 7, 1936.  LE RALPH A. WASHBURN  2,046,712
AUTOMATIC CONTROL SYSTEM
Filed March 8, 1935
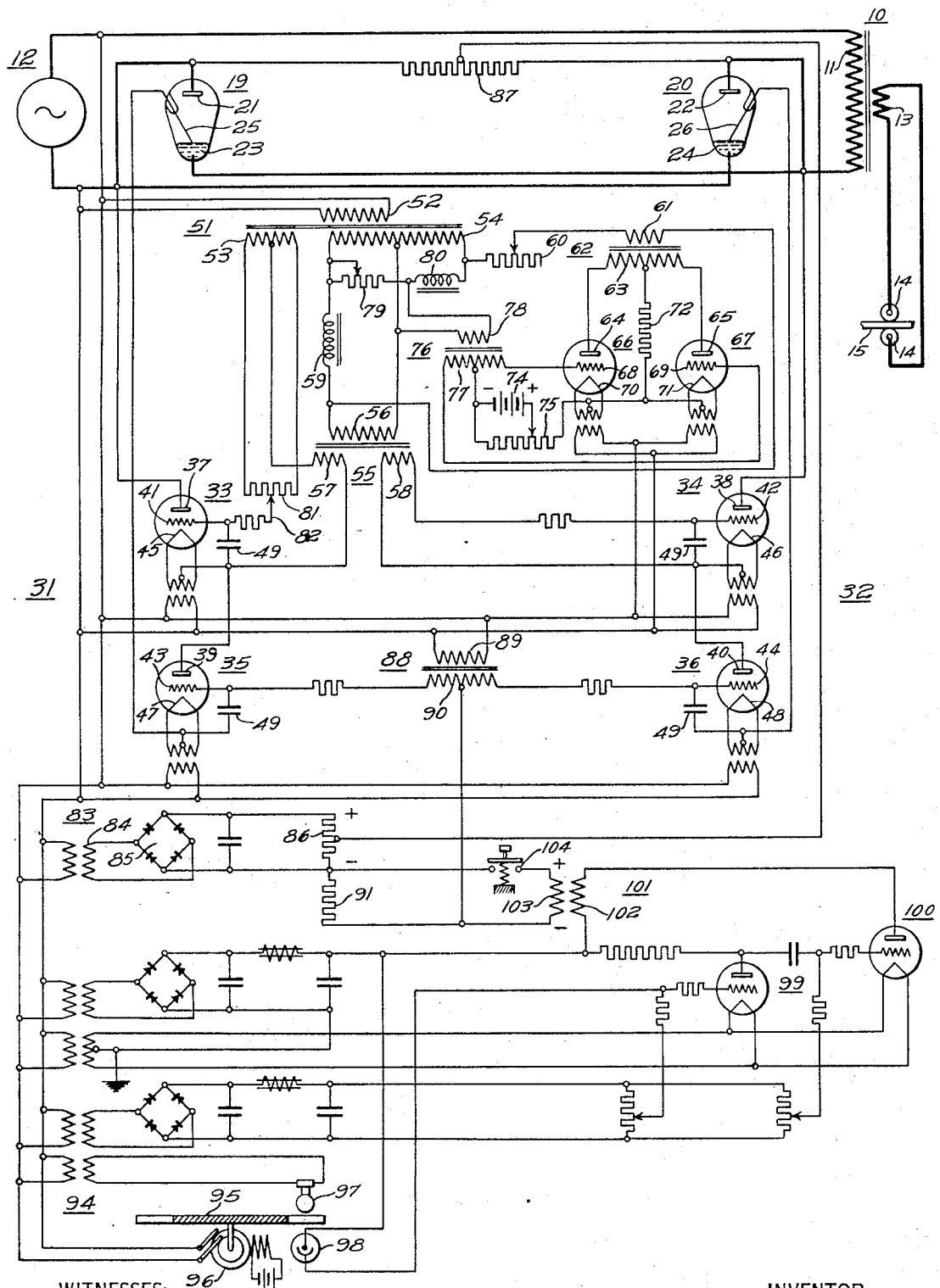
WITNESSES:
INVENTOR
Le Ralph A. Washburn.
BY
ATTORNEY Patented July 7, 1936

2,046,712

UNITED STATES PATENT OFFICE 2,046,712

AUTOMATIC CONTROL SYSTEM

Le Ralph A. Washburn, Chicopee Falls, Mass., assignor to Westinghouse Electric & Manufacturing Company, East Pittsburgh, Pa., a corporation of Pennsylvania Application March 8, 1935, Serial No. 10,089

14 Claims. (Cl. 171—119)

My invention relates, generally, to electrical control systems, and it has particular relation to systems for automatically controlling the flow of power in a load circuit.

In the performance of certain operations, such as electric resistance welding, it is highly desirable that a uniform predetermined heat be maintained at the welding electrodes. In the resistance welding of many alloys and special metals, it has been found that suitable welding conditions exist only under certain narrow limitations of welding heat. If too much heat is applied, the material will be burned, while if not enough heat is applied, proper welding conditions will not be maintained. In order to afford consistent results and to provide a uniform product, it is, therefore, desirable to maintain the welding heat at a predetermined value.

It will be understood that the heat which is supplied for performing the welding operation is proportional to the power which is supplied. One of the variables which enters into the operation of the system is the voltage of the supply circuit. In some power systems, the regulation may be poor, due either to lack of capacity of the power system, or to widely varying load conditions, or both. Since the power in the system is a function of the voltage, it will be readily understood that variations in line voltage will cause variations in the power which is supplied, and in turn, will cause variations in heat available for performing the welding operation.

In order to maintain the required heat, it is necessary to provide for compensating for voltage fluctuations. While manual means may be provided for accomplishing this compensation, it is difficult to effect it with any great degree of accuracy, since voltage changes may occur with considerable rapidity. In addition, in order to compensate for the voltage changes, the attention of the operator must be taken from the work which he is doing.

The object of my invention, generally stated, is to provide an automatic power control system which shall be simple and efficient in operation, and which may be readily and economically manufactured and installed.

The principal object of my invention is to provide for maintaining the power applied to a load circuit at a constant value, regardless of variations of the supply voltage.

An important object of my invention is to provide for regulating the portion of each cycle of alternating current that is permitted to flow to a load circuit in accordance with variations in the voltage of the supply circuit, in order to maintain the power supplied to the load circuit at a constant value.

Other objects of my invention will, in part, be obvious and, in part, appear hereinafter.

Accordingly, my invention is disclosed in the embodiment hereof shown in the accompanying drawing and comprises the features of construction, combination of elements, and arrangement of parts, which will be exemplified in the construction hereinafter set forth, and the scope of the application of which will be indicated in the appended claims.

For a more complete understanding of the nature and scope of my invention, reference may be had to the following detailed description, taken in connection with the accompanying drawing, in which the single figure diagrammatically represents a concrete embodiment of my invention.

According to my invention, a load circuit, which may be a resistance welding circuit, is arranged to be energized with alternating current from a suitable alternating-current generator. In order to control the flow of current to the load circuit a pair of oppositely connected rectifiers or arc discharge devices, such as "Ignitrons", is provided between the current source and the load circuit. The "Ignitrons" have the characteristic of being conducting for half-cycle periods only when they are rendered conducting during each half cycle. It will, therefore, be understood that current is permitted to flow from the power source to the load circuit during successive half cycles when the "Ignitrons" are successively rendered conducting during each of the half cycles.

When the load circuit comprises a welding transformer which is used for performing resistance welding operations, it is desirable, as is well known, to provide for intermittent flow of current. That is, it is desirable to permit the flow of current for a number of cycles, for example, two cycles, and then to discontinue the flow of current for a number of cycles, for example, four cycles. Satisfactory welding conditions are then provided without burning the parts being welded, which would otherwise be the case if welding current were continually supplied. In order to obtain this intermittent character of operation, a photo-electric timer is provided which is arranged to cause the flow of current in the manner indicated.

With a view to obtaining further range of adjustment of the power that is supplied to the load circuit, and which is represented by heat in the welding circuit, means are provided for controlling the time in each half cycle when the arc discharge devices are rendered conducting. Thus, the power supplied to the load circuit may be varied assuming a constant line voltage by advancing or retarding the time in each half cycle at which current flow is initiated.

According to my invention, I make use of this principle and provide for regulating the time in each half cycle at which the arc discharge devices are rendered conducting in accordance with variations in the voltage of the alternating-current source which is connected to supply power to the system. For example, when the voltage of the power source decreases, the system is automatically effective to advance the time in each half cycle when the arc discharge devices are rendered conducting. In like manner, when the voltage of the power source increases above a predetermined value, the time in each half cycle at which the arc discharge devices are rendered conducting is retarded. By suitable design and arrangement of the automatic control apparatus, it is possible to maintain the same power flow to the load circuit and consequently, the same value of welding heat despite fluctuations in the voltage of the power source over a wide range.

Referring now particularly to the single figure of the drawing, the reference character 10 designates, generally, a welding transformer having a primary winding 11 which is connected to be energized from a source of alternating current 12 which may be a 60-cycle generator. The welding transformer 10 is also provided with a secondary winding 13 which is connected to supply current to the welding circuit including the electrodes 14 between which work 15 on which the welding operation is to be performed may be placed. The welding electrodes 14 are illustrated in the drawing as being rollers. However, it will be understood that any other suitable type of welding electrodes may be used without departing from the scope of this invention.

In order to control the flow of welding current to the welding circuit, a pair of inversely connected arc discharge devices of the "Ignitron" type, shown generally at 19 and 20, is provided and is connected between the primary winding 11 of the welding transformer 10 and the alternating-current source 12. Each of the arc discharge devices 19 and 20 comprises respectively, anodes 21 and 22, mercury pool cathodes 23 and 24 and control electrodes 25 and 26. When current is caused to flow from the anodes 21 and 22 through the control electrodes 25 and 26 into the mercury pool cathodes 23 and 24, cathode spots are formed on the latter which will cause the arc discharge devices 19 and 20 to become conducting, when thus ignited, provided that the proper polarity for which they are adapted to be conducting is applied thereto. In other words, each of the arc discharge devices 19 and 20 will become conducting on the application of the proper polarity or half cycle thereto, provided that the cathode spot is formed in the half cycle for which either of them is adapted to become conducting. The arc discharge devices 19 and 20 will remain in the conducting state until the end of a half cycle and will not again become conducting unless in a succeeding half cycle, the cathode spot is formed as described herein.

In order to energize the control electrodes 25 and 26 for the purpose of forming the cathode spots in the arc discharge devices 19 and 20, control circuits, shown generally at 31 and 32, are provided. The circuits 31 and 32 comprise space discharge devices 33 and 34, respectively, which are controlled by means of a phase shifting circuit and also space discharge devices 35 and 36 which are disposed to be controlled by means of a phototimer circuit. As illustrated, each of the space discharge devices 33, 34, 35 and 36 is provided, respectively, with anodes 37, 38, 39 and 40, grids 41, 42, 43 and 44 and hot cathodes 45, 46, 47 and 48. As illustrated, a capacitor 49 is connected between each of the grids 41, 42, 43 and 44 and its respective cathode 45, 46, 47 and 48, in order to maintain the former at a predetermined potential relative to the latter.

As set forth hereinbefore, the space discharge devices 33 and 34 are controlled by means of a phase shifting circuit. This circuit is energized by means of a phase shifting transformer shown generally at 51 and comprising a primary winding 52, which is connected to be energized from the alternating-current source 12, and secondary windings 53 and 54. A phase shift grid transformer 55 is provided having a primary winding 56 which is disposed to be energized from the secondary winding 54 of the phase shift transformer 51. The phase shift grid transformer 55 is provided with secondary windings 57 and 58 which are connected, respectively, to the grids 41 and 42 of the space discharge devices 33 and 34, for applying thereto the proper energizing potential.

It will be observed that the primary winding 56 of the phase shift grid transformer 55 is connected to the secondary winding 54 through a phase shifting network comprising an inductor 59, an adjustable resistor 60 and the primary winding 61 of a transformer 62. The times at which the grids 41 and 42 have applied thereto the proper energizing potential will depend upon the adjustment of the resistor 60 as well as upon the effective resistance of the primary winding 61.

As illustrated, the transformer 62 is provided with a secondary winding 63, the terminals of which are connected to the anodes 64 and 65 of rectifier tubes 66 and 67, respectively, of the high vacuum type. The rectifier tubes 66 and 67 are provided with grids 68 and 69 and hot cathodes 70 and 71, and are arranged to supply a load circuit comprising a resistor 72.

It will be understood that the conductivity of the rectifier tubes 66 and 67 may be varied by altering the potential which is applied to the grids 68 and 69. Normally, a negative potential is applied thereto by means of a battery 74, the effect of which may be adjusted by means of potentiometer 75.

In order to render the grids 68 and 69 responsive to the voltage of the alternating-current source 12, a transformer 76 is provided having a secondary winding 77, the terminals of which are connected to the grids 68 and 69. The primary winding 78 of the transformer 76 may be connected between the center tap of the secondary winding 54 and the common connection between a potentiometer 79 and an inductor 80, both of which may be connected for energization across the terminals of the secondary winding 54.

It will be observed that the primary winding 78 is energized from a phase shifting circuit comprising the potentiometer 79 and the inductor 80. This circuit is provided for permitting accurate adjustment of the control potentials applied to the grids 68 and 69 with respect to their phase relationship with the potential applied to the anodes 64 and 65 and with the current flowing to the transformer 10. It will be understood, however, that in certain instances, the phase shifting circuit comprising the potentiometer 79 and the inductor 80 may be omitted and that the primary winding 78 of the transformer 76 may be connected directly to the alternating-current power source 12.

It is desirable to provide for altering the relative time in each half cycle at which the space discharge devices 33 and 34 are rendered conducting. Such adjustment is desirable in order to compensate for certain unsymmetrical characteristics of the arc discharge devices 19 and 20, which may be due to lack of uniformity in their manufacture and construction. For this purpose, a potentiometer 81 is provided, which is connected across the secondary winding 53, as illustrated. One terminal of the secondary winding 57 is connected to a mid-tap of the secondary winding 53 and the grid 41 is connected as shown to the potentiometer 81, by means of the arm 82. By altering the position of the arm 82 along the potentiometer 81, it is possible to cause the space discharge device 33 to be rendered conducting either earlier or later than the space discharge device 34 is rendered conducting in a succeeding half cycle, since the proper energizing potential is applied to their respective grids 41 and 42, during each succeeding half cycle.

Since it is not ordinarily desirable to have the arc discharge devices 19 and 20 conducting during each successive half cycle, but rather, it is desirable to have them conducting for a predetermined number of half cycles, and non-conducting for a predetermined number of half cycles, as set forth hereinbefore, the space discharge devices 35 and 36 are provided. When the space discharge devices 35 and 36 are rendered conducting the circuit is completed between the anodes 21 and 22 and the cathodes 23 and 24 of the arc discharge devices 19 and 20, respectively, through the control electrodes 25 and 26, so that the cathode spots described herein will be formed to render the arc discharge devices 19 and 20 conducting.

In order to maintain the space discharge devices 35 and 36 in the non-conducting state, a negative potential is applied to the grids 43 and 44. This negative potential may be obtained from a grid biasing circuit shown generally at 83, and comprising a transformer 84 and a rectifier 85. As illustrated, the rectifier 85 is connected across a resistor 86 to apply the indicated polarities to the terminals thereof.

It is desirable to apply the biasing potentials to the grids 43 and 44 over symmetrical circuits. For this purpose, a resistor 87 is connected between the anodes 21 and 22 of the arc discharge devices 19 and 20. The mid-point of the resistor 87 is connected as illustrated to a point along the resistor 86. A grid transformer, shown generally at 88, having a primary winding 89 connected to the source 12 and a secondary winding 90, the terminals of which are connected to the grids 43 and 44, is provided. The use of the grid transformer 88 obviates the necessity for employing two separate control circuits for the grids 43 and 44. It will be noted that the cathode 48 of the space discharge device 36 is connected to a potential which is opposite to that of the potential to which the cathode 47 of the space discharge device 35 is connected. The grid transformer 88 reduces the cathodes 47 and 48 to the same potential insofar as the grids 43 and 44 are concerned.

The negative biasing direct-current potential as obtained from the biasing circuit 83, is applied through a resistor 91 to a mid-tap of the secondary winding 90. It will be observed that the control circuit for applying the biasing potential to the grids 43 and 44 is connected between the mid-point of the resistor 87 and the mid-tap of the secondary winding 90. This circuit arrangement permits the application of the same biasing potential to each of the grids 43 and 44 and eliminates any unsymmetrical application of biasing potential.

In order to render the space discharge devices 35 and 36 conducting, a positive ionizing potential is applied to the grids 43 and 44 to overcome the negative potential that is normally applied thereto. For this purpose a photo-electric system, shown generally at 94, may be provided comprising a disc 95 which is arranged to be rotated by means of a synchronous motor 96. The photo-electric system 94 may be constructed in accordance with the teachings of the copending application of Edwin H. Vedder, Serial No. 710,095, filed February 1, 1934, and assigned to the assignee of this application. The disc 95 is provided with teeth around its periphery, which are arranged to intercept the rays of light from a light source 97 as they fall on a photo-cell 98. The photo-cell 98 is connected in the grid circuit of an amplifying tube 99, the output of which is applied to a timer control tube 100. An impulse transformer, shown generally at 101, and comprising a primary winding 102, connected in the plate circuit of the timer control tube 100, is provided. A secondary winding 103 of the impulse transformer 101 is connected through a push button control switch 104 across the resistor 91. The polarity of the impulse appearing at the terminals of the secondary winding 103 is, as indicated, such as to oppose the potential applied to the resistor 91 and in addition, to overcome it so that a positive potential is applied to the grids 43 and 44.

As illustrated, any suitable circuits may be provided for applying the proper potentials to the elements of the amplifier tube 99 and the timer control tube 100. Since the circuits shown in the drawing are typical and well known to those skilled in the art, a description thereof will not be set forth herein.

In operation, assuming that the proper adjustments of the resistor 60, the potentiometer 79 and the potentiometer 81 have been made, so that the space discharge devices 33 and 34 are rendered conducting at the proper times, and that the system is energized under normal voltage conditions, the operator may initiate the functioning of the system by depressing the push button switch 104. The light rays which are permitted to impinge on the photo-cell 98 cause an impulse to be applied to the amplifier tube 99, which is amplified thereby and applied to the timer control tube 100. This impulse appears across the terminals of the secondary winding 103 of the impulse transformer 101 and is applied to the grids 43 and 44 of the space discharge devices 35 and 36, respectively.

Assuming that the space discharge device 35 will become conducting on the application of the first impulse, the arc discharge device 19 will not be rendered conducting until the space discharge device 33 is rendered conducting by the application of the proper ionizing voltage to the grid 41. When the proper ionizing voltage is applied to the grid 41 both of the space discharge devices 33 and 35 will become conducting to permit the flow of current to the control electrode 25 to form the cathode spot for igniting the arc discharge device 19 and rendering it conducting.

In like manner, the next impulse appearing across the secondary winding 103 of the impulse transformer 101 will be in proper time to complete a corresponding sequence of functioning of the space discharge devices 34 and 36 for rendering the arc discharge devices 19 and 20 conducting.

As long as the operator holds the control switch 104 in the closed position, welding current will be passed between the welding electrodes 14 and through the work 15 for a predetermined number of cycles and will be cut off for a predetermined number of cycles. As soon as the control switch 104 is released, the welding current will cease to flow at the expiration of the next succeeding half cycle.

It will be understood that an increase in the resistance of the circuit comprising the resistor 60 and the primary winding 61 of the transformer 62 causes an advance in the time at which the grids 41 and 42 are energized. Thus, if the line voltage drops, in order to maintain the same power flow in the circuit, it is necessary to advance the time when the grids 41 and 42 are energized by increasing the resistance of this circuit. This may be accomplished, as in the past, by manually adjusting the resistor 60. However, according to my invention, this is automatically accomplished by varying the effective resistance of the primary winding 61.

Since the primary winding 78 of the transformer 75 is connected to be responsive to the voltage of the alternating-current source 12, it will be apparent that voltage fluctuations therein will be reflected in the biasing potentials which are applied to the grids 68 and 69. Thus with a decrease in line voltage, the voltage appearing across the terminals of the secondary winding 77 will decrease. Since the voltage tends to decrease the negative potential applied to the grids 68 and 69, a decrease therein causes an increased negative potential to be applied to the grids 68 and 69 and consequently the conductivity of the tubes 66 and 67 will be decreased. The current flowing through the resistor 72 is thus decreased and the effective impedance of the secondary winding 63 is increased. In effect, the resistance of the primary winding 61 is increased in an amount corresponding to the drop in voltage of the alternating-current source 12 and as a result, the time at which the grids 41 and 42 are energized is advanced, thereby permitting the arc discharged devices 19 and 20 to be conducting for a greater portion of each half cycle. It will then be understood that by proper arrangement of the rectifier circuit including the rectifier tubes 66 and 67, it is possible to maintain the power which is supplied to the transformer 10 and consequently the heat which is provided at the welding electrodes 14 at a substantially constant value despite wide fluctuations in the voltage of the alternating-current source 12.

While the automatic circuit including the rectifier tubes 66 and 67 has been illustrated for showing how the potential for energizing the grids 41 and 42 may be automatically adjusted in accordance with variations in the voltage of the alternating-current source 12, it will be understood that any other suitable automatic control system may be substituted therefor.

Since certain further changes may be made in the foregoing construction, and different embodiments of the invention may be made without departing from the scope thereof, it is intended that all matter set forth in the accompanying description or shown in the accompanying drawing shall be interposed as illustrative and not in a limiting sense.

I claim as my invention:

1. An electric power system comprising, in combination, a load circuit, circuit means connecting the load circuit to a source of alternating current, electronic conducting means connected to control the flow of current in said load circuit, control means for rendering said electronic means conducting to permit the flow of load current, phase shift means connected to be energized from the source of alternating current for effecting the energization of said control means at a predetermined time in a cycle of the alternating current, means automatically responsive to variations in the voltage of said alternating-current source for controlling the functioning of said phase shift means to correspondingly adjust the time in each cycle when said electronic means is rendered conducting, and means for rendering said control means intermittently effective in controlling the conductivity of said electronic means.

2. An electric power system comprising, in combination, a load circuit, circuit means connecting the load circuit to a source of alternating current, a pair of inversely connected uni-directional conducting electronic devices disposed to conduct the entire flow of current in said load circuit, control means for rendering said electronic means conducting to permit the flow of load current, phase shift means connected to be energized from the source of alternating current for effecting the energization of said control means at a predetermined time in a cycle of the alternating current, and means automatically responsive to variations in the voltage of said alternating current source for controlling the functioning of said phase shift means to correspondingly adjust the time in each cycle when said electronic means is rendered conducting for maintaining the power supplied to the load circuit substantially constant.

3. An electric power system comprising, in combination, a load circuit, circuit means connecting the load circuit to a source of alternating current, a pair of inversely connected uni-directional conducting electronic devices disposed to control the flow of current in said load circuit, a control electrode individual to each electronic device, phase shift means connected to be energized from the source of alternating current for effecting the energization of said control electrodes at predetermined times in each half cycle of the alternating current for rendering said electronic devices conducting, control means automatically responsive to variations in the voltage of said alternating-current source for controlling the functioning of said phase shift means to correspondingly adjust the time in each half cycle at which said electronic devices are rendered conducting for maintaining the power supplied to the load circuit at a substantially constant value and means for rendering said phase shift means intermittently effective in controlling the conductivity of said electronic devices.

4. An electric power system comprising, in combination, a load circuit, circuit means for connecting the load circuit to a source of alternating current, arc discharge means connected to control the flow of current in said load circuit, control means for rendering said arc discharge means conducting, space discharge means disposed on becoming conducting to effect the energization of said control means, phase shift means connected to be energized from said source of alternating current for rendering said space discharge means conducting at predetermined times in each cycle of the alternating current, means automatically responsive to variations in the voltage of said alternating-current source for controlling the functioning of said phase shift means to correspondingly adjust the time in each cycle when said arc discharge means is rendered conducting and means for rendering said control means intermittently effective in controlling the conductivity of said arc discharge means.

5. An electric power system comprising, in combination, a load circuit, circuit means for connecting the load circuit to a source of alternating current, a pair of inversely connected arc discharge devices connected to conduct the entire flow of current in said load circuit, a control electrode individual to each arc discharge device, a space discharge device individual to each control electrode and disposed on becoming conducting to effect the energization of said control electrodes, phase shift means connected to be energized from said source of alternating current for rendering said space discharge devices conducting at predetermined times in each cycle of the alternating current, and control means automatically responsive to variations in the voltage of said alternating-current source for regulating said phase shift means to adjust the time in each cycle at which said arc discharge devices are rendered conducting for maintaining the power supplied to the load circuit at a substantially constant value.

6. An electric power system comprising, in combination, a load circuit, circuit means connecting the load circuit to a source of alternating current, arc discharge means connected to control the flow of current in said load circuit, control means disposed to render said arc discharge means conducting to permit the flow of load current, phase shift means including an adjustable impedance device connected to be energized from the source of alternating current for effecting the energization of said control means at predetermined times in each cycle of the alternating current, means for automatically regulating said impedance device in accordance with variations in the voltage of the alternating current source to vary the times in each cycle at which said arc discharge means is rendered conducting for maintaining the power supplied to the load circuit substantially constant and means for rendering said control means intermittently effective to control the conductivity of said arc discharge means.

7. An electric power system comprising, in combination, a load circuit, circuit means connecting the load circuit to a source of alternating current, arc discharge means connected to conduct the entire flow of current in said load circuit, control means disclosed to render said arc discharge means conducting to permit the flow of load current, phase shift means including an adjustable impedance device connected to be energized from the source of alternating current for effecting the energization of said control means at predetermined times in each cycle of the alternating current, vacuum tube means provided with control electrode means for controlling said adjustable impedance means, and means for controlling the energization of said control electrode means in accordance with variations in the voltage of the alternating-current source to vary the times in each cycle at which said arc discharge means is rendered conducting for maintaining the power supplied to the load circuit substantially constant.

8. An electric power system comprising, in combination, a load circuit, circuit means connecting the load circuit to a source of alternating current, arc discharge means connected to conduct the entire flow of current in said load circuit, control means disposed to render said arc discharge means conducting to permit the flow of load current, phase shift means including an adjustable impedance device connected to be energized from the source of alternating current for effecting the energization of said control means at predetermined times in each cycle of the alternating current, vacuum tube means provided with control electrode means for controlling said adjustable impedance means, and additional phase shift means connected to be energized from the source of alternating current for controlling the energization of said control electrode means in accordance with variations in the voltage of the alternating-current source to vary the times in each cycle at which said arc discharge means is rendered conducting for maintaining the power supplied to the load circuit substantially constant.

9. An electric power system comprising, in combination, a load circuit, circuit means connecting the load circuit to a source of alternating current, a pair of inversely connected arc discharge devices disposed to control the flow of current in said load circuit, control means disposed to render said arc discharge devices conducting to permit the flow of load current, phase shift means including an adjustable impedance device connected to be energized from the source of alternating current for effecting the energization of said control means at predetermined times in each cycle of the alternating current, means for automatically regulating said impedance device in accordance with variations in the voltage of the alternating-current source to vary the times in each cycle at which said arc discharge devices are rendered conducting for maintaining the power supplied to the load circuit substantially constant and means for rendering said control means intermittently effective to control the conductivity of said arc discharge devices.

10. An electric power system comprising, in combination, a load circuit, circuit means connecting the load circuit to a source of alternating current, a pair of inversely connected arc discharge devices disposed to conduct the entire flow of current in said load circuit, control means disposed to render said arc discharge means conducting to permit the flow of load current, phase shift means including an adjustable impedance device connected to be energized from the source of alternating current for effecting the energization of said control means at predetermined times in each cycle of the alternating current, vacuum tube means provided with control electrode means for controlling said adjustable impedance means, and means for controlling the energization of said control electrode means in accordance with variations in the voltage of the alternating-current source to vary the times in each cycle at which said arc discharge devices are rendered conducting for maintaining the power supplied to the load circuit substantially constant.

11. An electric power system comprising, in combination, a load circuit, circuit means connecting the load circuit to a source of alternating current, a pair of inversely connected arc discharge devices disposed to control the flow of current in said load circuit, control means disposed to render said arc discharge devices conducting to permit the flow of load current, phase shift means including an adjustable impedance device connected to be energized from the source of alternating current for effecting the energization of said control means at predetermined times in each cycle of the alternating current, vacuum tube means provided with control electrode means for controlling said adjustable impedance means, additional phase shift means connected to be energized from the source of alternating current for controlling the energization of said control electrode means in accordance with variations in the voltage of the alternating-current source to vary the times in each cycle at which said arc discharge devices are rendered conducting for maintaining the power supplied to the load circuit substantially constant and means for rendering said control means intermittently effective in controlling the conductivity of said arc discharge devices.

12. An electric power system comprising, in combination, a load circuit, circuit means for connecting the load circuit to a source of alternating current, a pair of inversely connected arc discharge devices connected to control the flow of current in said load circuit, a control electrode individual to each arc discharge device, a space discharge device individual to each control electrode and disposed on becoming conducting to effect the energization of said control electrodes, phase shift means including an adjustable impedance device connected to be energized from the source of alternating current for rendering said space discharge devices conducting at predetermined times in each cycle of the alternating current, and means for automatically regulating said impedance device in accordance with variations in the voltage of the alternating-current source to vary the times in each cycle at which said arc discharge devices are rendered conducting for maintaining the power supplied to the load circuit substantially constant.

13. An electric power system comprising, in combination, a load circuit, circuit means for connecting the load circuit to a source of alternating current, a pair of inversely connected arc discharge devices connected to control the flow of current in said load circuit, a control electrode individual to each arc discharge device, a space discharge device individual to each control electrode and disposed on becoming conducting to effect the energization of said control electrodes, phase shift means including an adjustable impedance device connected to be energized from the source of alternating current for rendering said space discharge devices conducting at predetermined times in each cycle of the alternating current, vacuum tube means provided with control electrode means for controlling said adjustable impedance means, and means for controlling the energization of said control electrode means in accordance with variations in the voltage of the alternating-current source to vary the times in each cycle at which said arc discharge devices are rendered conducting for maintaining the power supplied to the load circuit substantially constant.

14. An electric power system comprising, in combination, a load circuit, circuit means for connecting the load circuit to a source of alternating current, a pair of inversely connected arc discharge devices connected to control the flow of current in said load circuit, a control electrode individual to each arc discharge device, a space discharge device individual to each control electrode and disposed on becoming conducting to effect the energization of said control electrodes, phase shift means including an adjustable impedance device connected to be energized from the source of alternating current for rendering said space discharge devices conducting at predetermined times in each cycle of the alternating current, vacuum tube means provided with control electrode means for controlling said adjustable impedance means, and additional phase shift means connected to be energized from the source of alternating current for controlling the energization of said control electrode means in accordance with the voltage of the alternating-current source to vary the times in each cycle at which said arc discharge devices are rendered conducting for maintaining the power supplied to the load circuit substantially constant.

LE RALPH A. WASHBURN.